United States Patent
Kalevo et al.

(10) Patent No.: US 8,965,045 B2
(45) Date of Patent: Feb. 24, 2015

(54) IMAGE CAPTURE

(75) Inventors: Ossi Mikael Kalevo, Toijala (FI); Matti Sakari Hamalainen, Lempaala (FI); John Samuels, Tarleton (GB); Juha H. Alakarhu, Helsinki (FI); Euan James Barron, Tampere (FI); Marko Torvinen, Lempaala (FI)

(73) Assignee: Nokia Corporation, Espoo (FI)

( * ) Notice: Subject to any disclaimer, the term of this patent is extended or adjusted under 35 U.S.C. 154(b) by 226 days.

(21) Appl. No.: 13/401,986

(22) Filed: Feb. 22, 2012

(65) Prior Publication Data

US 2013/0216092 A1  Aug. 22, 2013

(51) Int. Cl.
   *G06K 9/00* (2006.01)

(52) U.S. Cl.
   USPC ......................................................... 382/103

(58) Field of Classification Search
   None
   See application file for complete search history.

(56) References Cited

U.S. PATENT DOCUMENTS

| | | | |
|---|---|---|---|
| 6,005,609 A * | 12/1999 | Cheong | 348/169 |
| 6,323,898 B1 * | 11/2001 | Koyanagi et al. | 348/169 |
| 7,218,342 B2 * | 5/2007 | Kobayashi et al. | 348/211.8 |
| 2003/0053661 A1 * | 3/2003 | Magarey | 382/103 |
| 2003/0095183 A1 * | 5/2003 | Roberts et al. | 348/153 |
| 2008/0255826 A1 * | 10/2008 | Hio | 704/10 |
| 2009/0135254 A1 * | 5/2009 | Chiang-Lin | 348/169 |
| 2009/0231441 A1 * | 9/2009 | Walker et al. | 348/207.1 |
| 2010/0067741 A1 * | 3/2010 | Stolkin et al. | 382/103 |
| 2010/0271485 A1 * | 10/2010 | Kim | 348/169 |
| 2010/0321503 A1 * | 12/2010 | Sakata | 348/169 |
| 2011/0069196 A1 * | 3/2011 | Jung et al. | 348/222.1 |
| 2011/0254950 A1 * | 10/2011 | Bibby et al. | 348/135 |
| 2012/0020520 A1 * | 1/2012 | Lin et al. | 382/103 |
| 2013/0147980 A1 * | 6/2013 | Gardenfors et al. | 348/222.1 |

\* cited by examiner

*Primary Examiner* — Shervin Nakhjavan
(74) *Attorney, Agent, or Firm* — Harrington & Smith

(57) ABSTRACT

An apparatus including a processor configured to move automatically a sub-set of pixels defining a target captured image within a larger set of available pixels in a direction of an edge of the target captured image when a defined area of interest within the target captured image approaches the edge of the target captured image and configured to provide a pre-emptive user output when the sub-set of pixels approaches an edge of the set of available pixels.

21 Claims, 7 Drawing Sheets

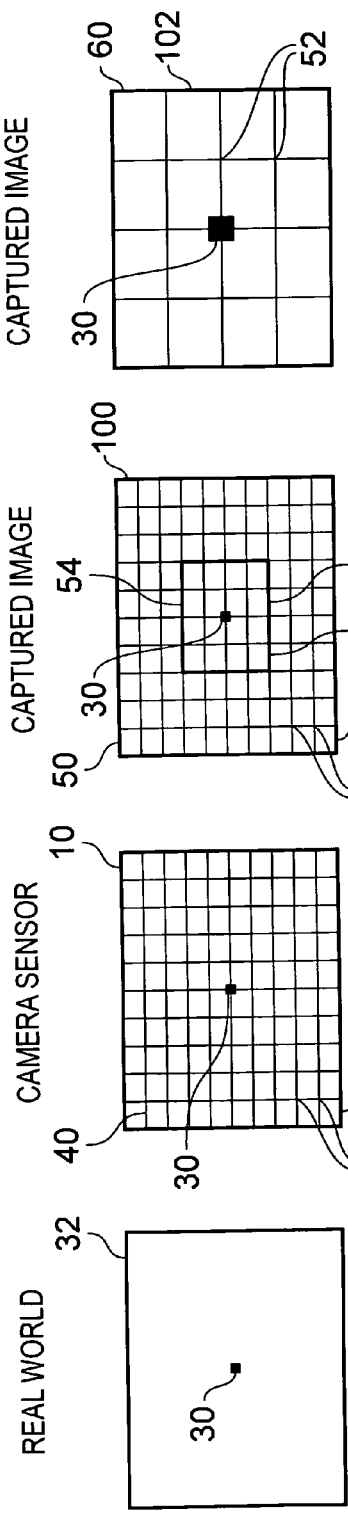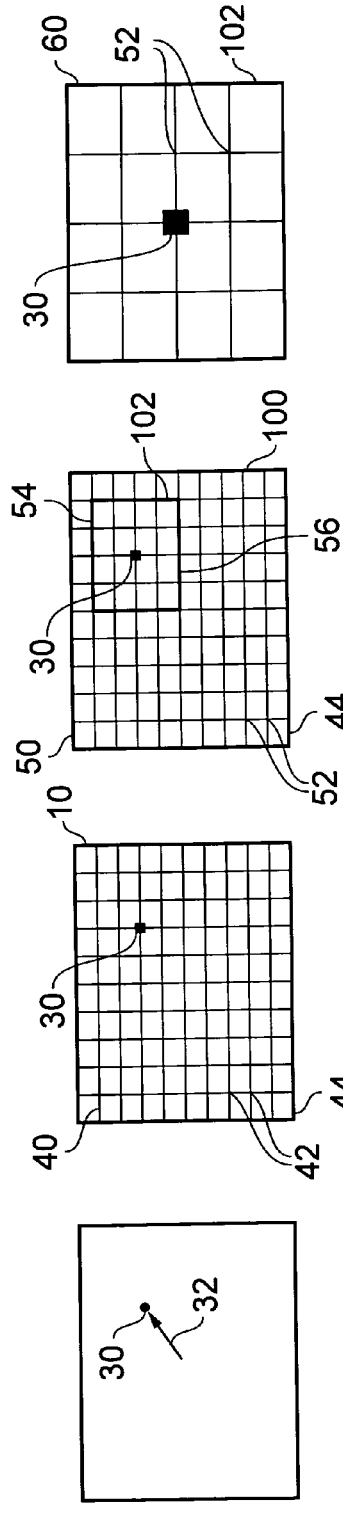

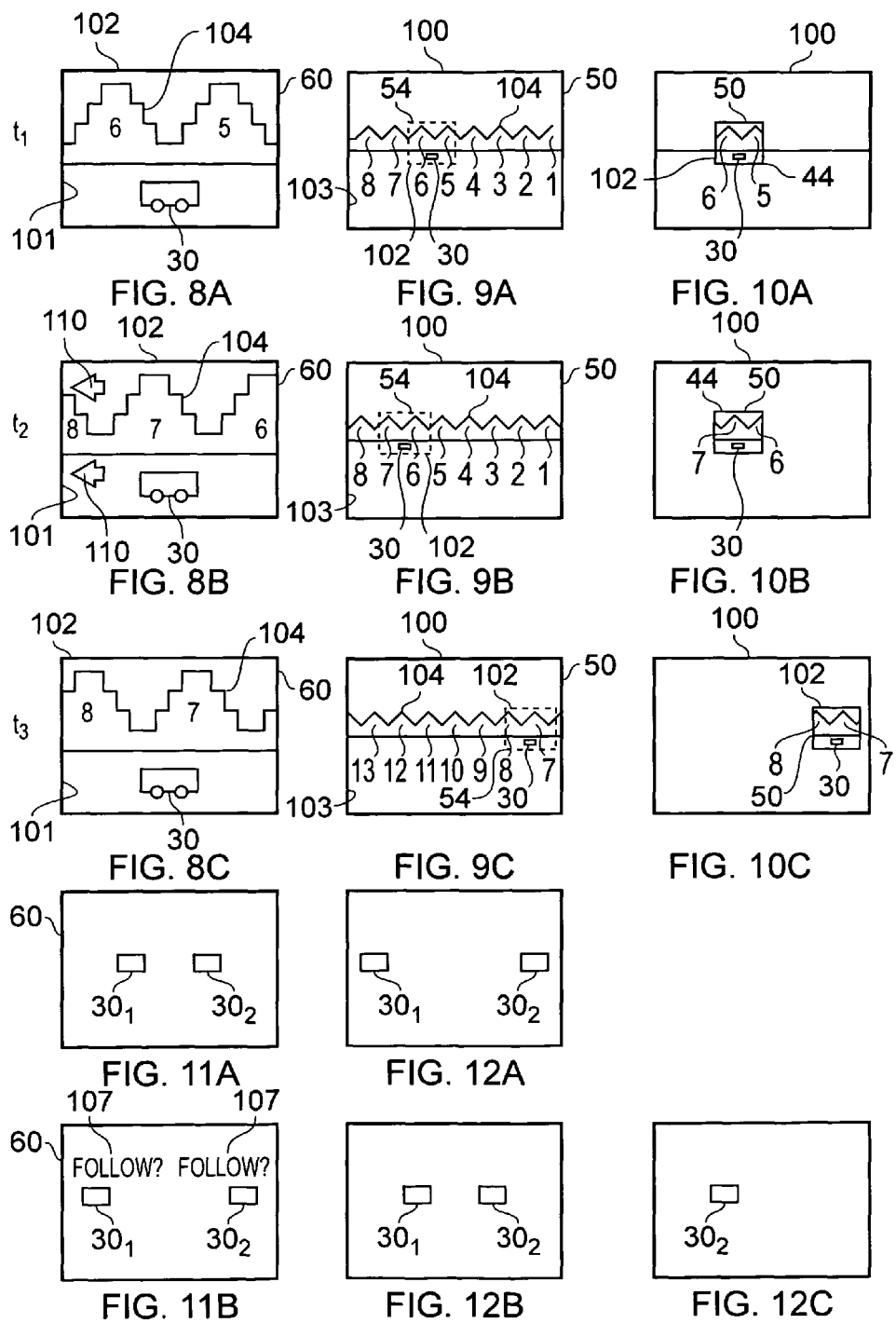

IMAGE CAPTURE

TECHNOLOGICAL FIELD

Embodiments of the present invention relate to image capture.

BACKGROUND

Digital camera sensors are now used for image capture in portable electronic apparatuses such as portable cameras and mobile cellular telephones.

A digital camera sensor captures an image as a plurality of pixels.

BRIEF SUMMARY

According to various, but not necessarily all, embodiments of the invention there is provided an apparatus comprising: a processor configured to move automatically a sub-set of pixels defining a target captured image within a larger set of available pixels in a direction of an edge of the target captured image when a defined area of interest within the target captured image approaches the edge of the target captured image and configured to provide a pre-emptive user output when the sub-set of pixels approaches an edge of the set of available pixels.

According to various, but not necessarily all, embodiments of the invention there is provided a method comprising: in response to detecting in a sub-set of pixels defining a target captured image, an area of interest approaching an edge of the target captured image, moving the sub-set of pixels within a larger set of available pixels in a direction of the edge; and in response to detecting the sub-set of pixels approaching an edge of the set of available pixels, providing a pre-emptive user output.

According to various, but not necessarily all, embodiments of the invention there is provided an apparatus comprising: at least one processor; and at least one memory including computer program code the at least one memory and the computer program code configured to, with the at least one processor, cause the apparatus at least to perform: in response to detecting in a sub-set of pixels defining a target captured image, an area of interest approaching an edge of the target captured image, moving the sub-set of pixels within a larger set of available pixels in a direction of the edge; and in response to detecting the sub-set of pixels approaching an edge of the set of available pixels, providing a pre-emptive user output.

BRIEF DESCRIPTION

For a better understanding of various examples of embodiments of the present invention reference will now be made by way of example only to the accompanying drawings in which:

FIG. 1 schematically illustrates an example of an apparatus comprising a processor and a camera sensor;

FIGS. 4A, 4B, 4C, 4D illustrate examples of notional stages in creating a target captured image at a first time according to a first embodiment;

FIGS. 5A, 5B, 5C, 5D illustrate examples of notional stages in creating a target captured image at a second time according to the first embodiment;

FIGS. 8A to 8C illustrate different sub-sets of pixels defining different target captured images at times t1, t2 and t3;

FIGS. 9A to 9C illustrate a post-capture embodiment in which the sets of available pixels are defined by captured images that were captured at times t1, t2 and t3 and sub-sets of pixels are selected post-capture from the captured images;

FIGS. 10A to 10C illustrate an alternative pre-capture embodiment in which the sets of available pixels are defined by the array of sensor elements and the sub-sets of pixels are sub-sets of sensor elements used to capture the captured images at times t1, t2 and t3;

FIGS. 11A and 11B illustrate one outcome, a request for user input, when two areas of interest simultaneously approach opposite edges of the sub-set of pixels;

FIGS. 12A and 12B illustrate one outcome, a change in the field of view, when two areas of interest simultaneously approach opposite edges of the sub-set of pixels;

FIGS. 12A and 12C illustrate a further outcome, prioritization of one area of interest, when two areas of interest simultaneously approach opposite edges of the sub-set of pixels;

DETAILED DESCRIPTION

Figure 1:
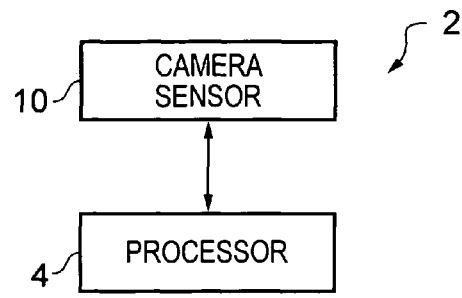

The Figures illustrate an apparatus 2 comprising: a processor 4 configured to move automatically a sub-set of pixels 102 defining a target captured image 60 within a larger set of available pixels 100 in a direction of an edge of the target captured image 60 when a defined area of interest 30 within the target captured image 60 approaches the edge of the target captured image 60 and configured to provide a pre-emptive user output 110 when the sub-set of pixels 102 approaches an edge of the set of available pixels 100.

A target captured image 60 may be a still image such as a photograph or may be a video frame. A video frame is an image in a series of images (the video). A photograph may be an isolated image or may be an image in a series of images (e.g. a burst of photographs).

A frame of reference is a reference frame used for the purpose of determining relative motion. The sensor frame of reference 44 may be a reference frame fixed in relation to the camera sensor 10. The image frame of reference 56 may be a reference frame fixed in relation to a portion of a scene being imaged, such as for example, an area of interest 30 that is being tracked.

The area of interest 30 may be defined manually or automatically. It may, for example, be an object that is to be tracked in a series of target captured images 60 as it moves relative to the camera sensor 10. The area of interest 30 is tracked so that it is captured, despite the relative movement, in a series of target captured images 60.

Capturing an image comprises creating an addressable data structure recording the image. The data structure is stored in a memory, for subsequent retrieval. Capturing an image should be contrasted with transiently displaying an image, for example in a viewfinder display, for review in advance of capture where an addressable data structure is not created and stored in a memory, for subsequent retrieval.

In some embodiments, the area of interest 30 is tracked using transverse tracking. In transverse tracking a field of view for a target captured image 60 remains constant, however, the position of the field of view tracks transversely (i.e. anywhere in a two-dimensional plane parallel to the plane of the camera sensor 10). As the field of view remains constant the size of portions of a scene captured in successive target captured images 60 remains constant but the positions of the portions change.

In some embodiments, in addition or as an alternative to transverse tracking, the area of interest 30 is tracked using depth tracking. In depth tracking a field of view for a target captured image 60 increases as the area of interest 30 approaches and decreases as the area of interest 30 become more distant. This change in the field of view maintains a constant ratio (scale) between the field of view and a size of the target captured image 60. The pixel count may be kept constant despite changes in the size of the field of view.

Some embodiments, enable 'select, point and shoot' video recording in which a user defines the area of interest 30 (select), generally points the camera sensor 10 in the direction of the defined area of interest 30 and captures video 60. Automatic transverse tracking may keep the area of interest 30 centrally located in successive video frames 60, despite the camera sensor 10 only pointing generally towards the area of interest 30 and despite movement of the area of interest 30. Automatic depth tracking, if used, may keep the area of interest 30 in the same proportion to the video frame 60, despite movement of the area of interest 30 towards or away from the camera sensor 10.

Some embodiments, enable 'point and shoot' video recording in which a user generally points the camera sensor 10 in a direction of interest and captures video 60. The area of interest 30 is automatically defined (select). Automatic transverse tracking may keep the area of interest 30 centrally located in successive video frames 60, despite the camera sensor 10 only pointing generally towards the area of interest 30 and despite movement of the area of interest 30. Automatic depth tracking, if used, may keep the area of interest 30 in the same proportion to the video frame 60, despite movement of the area of interest 30 towards or away from the camera sensor 10.

Thus an object 30 may be tracked automatically while recording video 60 such that the object 30 is automatically positioned within each captured video frame 60. If an object 30 is being videoed moves relative to a camera sensor 10 while the camera sensor 10 is recording video 60, then pixels used to define the video frames 60 automatically change so that the object 60 being videoed is tracked and remains prominently, perhaps centrally, positioned in the video frames 60 as recorded (captured) and as displayed on a viewfinder display. When the video is played back, the tracked object 30 will be presented in a substantially static foreground in front of a moving background.

In some embodiments, it may be a necessary condition that video recording is in progress before there is any automatic change of which pixels are used to define a target captured image 60.

Some embodiments, enable an object to be tracked automatically as described above before an still image is captured. When the still image is captured, the object has been automatically positioned within the captured still image.

FIG. 1 schematically illustrates an apparatus 2 comprising a processor 4 and a camera sensor 10.

The camera sensor 10 is configured to capture an image as a plurality of pixels.

A pixel is a picture element. Pixels may be monochrome pixels or color pixels. A monochrome pixel typically has an intensity value for a single parameter e.g. grayscale. A color pixel typically has an intensity value for each of a number of different parameters that span a multi-color color space. As an example, for a red-green-blue color space, a pixel is defined by a red intensity (R), a green intensity (G) and a blue intensity (B).

The camera sensor 10 comprises sensor elements. When an image is captured by the camera sensor 10, each sensor element provides a pixel of the image.

A sensor element may be a monochrome sensor element for capturing a monochrome pixel or a color sensor element for capturing a color pixel.

A monochrome sensor element typically detects an intensity value for a single parameter.

A color sensor element may have a number of sub-elements each of which detects an intensity value for one of the number of different parameters that span the color space. As an example, for a red-green-blue color space, a sensor element may comprise as spatially distributed sub-elements a red light detector that detects an intensity of red light (R), a green light detector that detects an intensity of green light (G), and a blue light detector that detects an intensity of blue light (B). In a Bayer arrangement, a sensor element comprises a 2×2 array of sub-elements comprising a red light detector at (0,0) detects an intensity of red light (R), green light detectors at (0,1) and (1,1) detect an intensity of green light (G), and a blue light detector at (1,1) detects an intensity of blue light (B).

The camera sensor 10 has a very high pixel count, that is, it comprises a very high number of sensor elements.

FIGS. 4B, 5B, 6B and 7B schematically illustrates a camera sensor 10 in which the sensor elements 42 are arranged in a fixed array 40. The Figures include a grid of N rows and M columns and a sensor element 42 is positioned where each row and column cross.

The illustrated camera sensor 10 is a reduced size camera sensor. The actual camera sensor 10 used in the apparatus 2 may have a pixel count (number of sensor elements 42) in excess of 30 million. In one embodiment, the camera sensor 10 comprises 40 million sensor elements 42.

Referring to FIGS. 4A, 5A, 6A and 7A, an image 32 from the real-world is captured as an array of pixels 52 using the array 40 of sensor elements 42. The captured image 50 is illustrated in FIGS. 4C, 5C, 6C and 7C.

In FIGS. 4C and 5C, the whole of the array 40 of sensor elements 42 is used to capture the captured image 50. As the array 40 is a N row by M column array of sensor elements 42, the captured image 50 is a N row by M column array of pixels 52. A sub-set 54 of the captured image 50 is used to define a target captured image 60 (FIGS. 4D and 5D). Whereas a whole scene is captured in the captured image 50 by the whole array 40 of sensor elements 42, the sub-set 54 of the captured image 50 has a reduced field of view and defines only a portion of the scene.

Figure 6A:
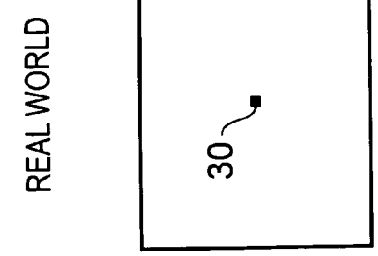
FIGS. 6A, 6B, 6C, 6D illustrate examples of notional stages in creating a target captured image at a first time according to a second embodiment.
Figure 6B:
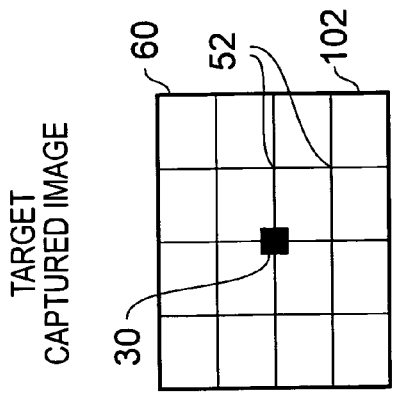
Figure 6C:
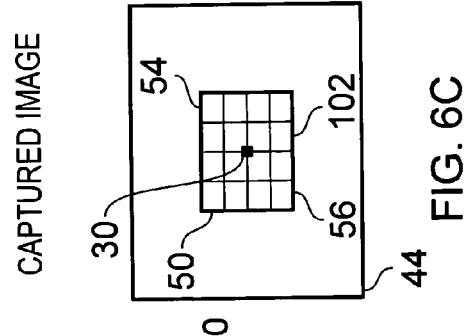
Figure 6D:
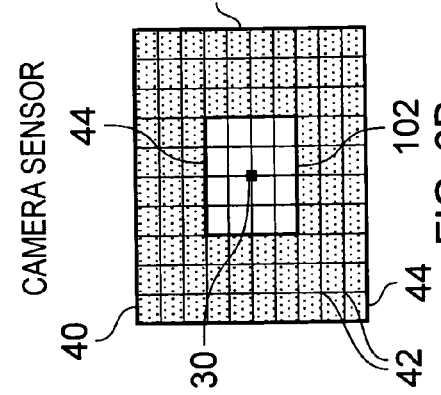
Figure 7A:
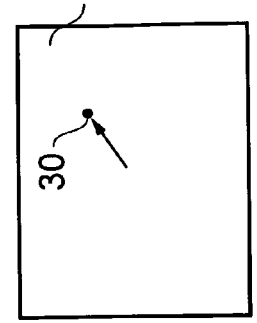
FIGS. 7A, 7B, 7C, 7D illustrate examples of notional stages in creating a target captured image at a second time according to the second embodiment.
Figure 7B:
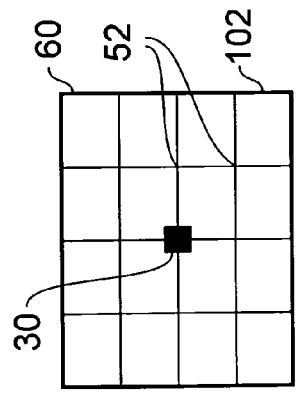
Figure 7C:
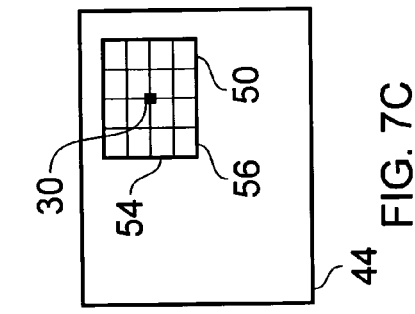
Figure 7D:
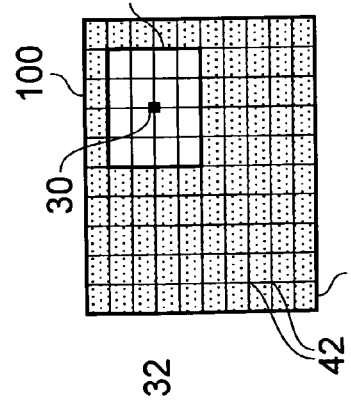

In FIGS. 6C and 7C, a sub-set 44 of the whole of the array 40 of sensor elements 42 is used to capture the captured image 50. As the sub-set 44 of the array 40 is a n row by m column array of sensor elements 42, the captured image 50 is a n row by m column array of pixels 52. The captured image 50 is used as the target captured image 60 (FIGS. 6D and 7D). Whereas the whole array 40 of sensor elements 42 capture a whole scene, the sub-set 44 has a reduced field of view and defines only a portion of the scene.

The processor 4 is configured to change automatically which pixels 52 are used to define a target captured image 60.

In FIGS. 4A to 7D, a sub-set of pixels 102 defining a target captured image 60 is moved automatically within a larger set of available pixels 100. In FIGS. 4A to 5D, the set of available pixels 100 is determined by the captured image 50 and the sub-set of pixels 102 is defined post-capture as a sub-set 54 of the captured image 50. In FIGS. 6A to 7D, the set of available pixels 100 is determined by the array 40 of sensor elements 40 and the sub-set of pixels 102 id defined pre-capture as a sub-set 44 of the array 40 of sensor elements 42. The change in which sub-set of pixels 102, selected from the set of available pixels 100, is used to define a target captured image 60 is in response to relative movement of a sensor frame of reference 44 defined by a camera sensor 10 and an image frame of reference 56 defined by the image 32.

The sensor frame of reference 44 is a reference frame that is fixed to and moves with the camera sensor 10. In FIGS. 4B, 5B, 6B and 7B the origin where the M=0 row and N=0 column meet is one arbitrary example of a sensor frame of reference 44.

The image frame of reference 56 is a reference frame that is fixed to and moves with the scene being captured. In FIGS. 4B, 5B, 6B and 7B the sensor frame of reference 44 is fixed to an area of interest 30.

The processor 4 is configured to automatically track the area of interest 30 when it moves relative to the camera sensor 10 by dynamically controlling which subset 54 of pixels 52 is used to define the target captured image 60. The processor 4 may perform transverse tracking which automatically ensures that the area of interest 30 remains within a target captured image 60, perhaps at a constant position within the target captured image 60. The processor 4 may additionally or alternatively perform depth tracking which ensures that the area of interest 30 remains at a constant scale relative to the target captured image 60.

Relative movement of the area of interest 30 and the camera sensor 10 may occur in various different ways. It may, for example, occur when an object in the area of interest 30 is moving while the apparatus 2 remains stationary. Tracking keeps the area of interest 30 within the target captured image 60 despite relative movement of the sensor frame of reference 44 and the image frame of reference 56. The area of interest 30 may in some embodiments be kept at a constant position within the target captured image 60, for example at the centre of the target captured image 60.

Figure 2:
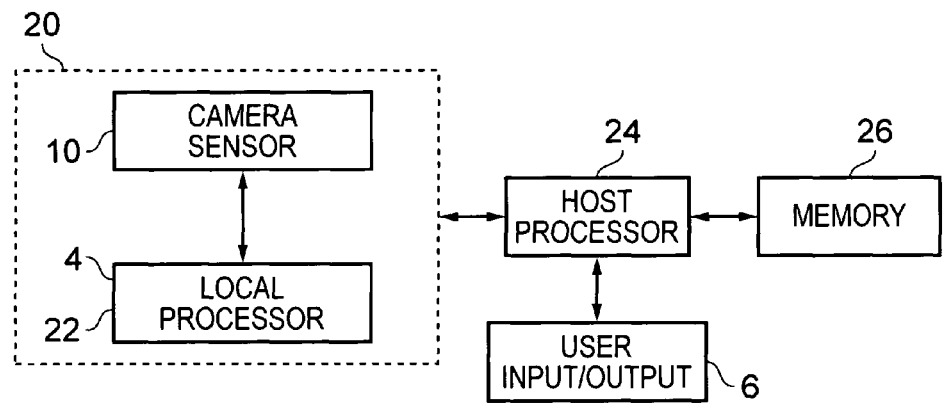
FIG. 2 illustrates an example of an apparatus comprising a camera sensor and a processor housed in a hardware module.

FIG. 2 illustrates an apparatus 2 comprising a camera sensor 10 and a processor 4 as previously described. In this example, processor 4 is a local processor 22 that is housed in a hardware module 20 along with the camera sensor 10.

The module 20 is part of a larger host apparatus 2. The host apparatus 2 comprises the module 20, a host processor 24, a memory 26 and user input and user output 6.

The host processor 24 is configured to read from and write to the memory 26. It is also configured to receive input commands from the user input 6 and provide output commands to the user output 6. The host processor 24 is also configured to communicate with the module 20.

The host processor 24 may be a multi-functional processor such as, for example, a central processing unit.

In this example, the functions of the processor 4 are performed by only the local processor 22.

In other implementations, the functions of the processor 4 may be performed by only the host processor 24.

In still other implementations, the functions of the processor 4 may be performed by the host processor 24 and the local processor 22.

Figure 3:
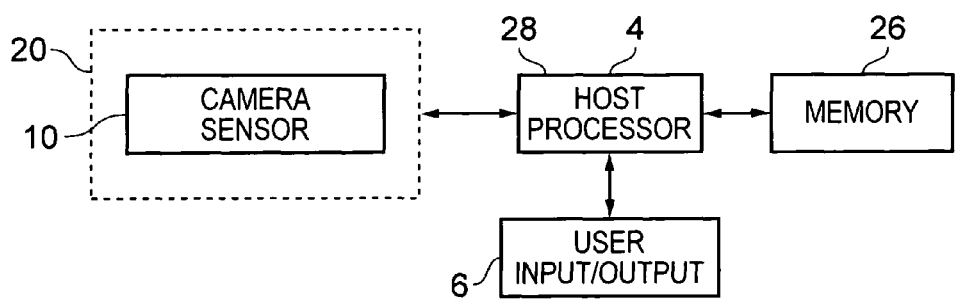
FIG. 3 illustrates an example of an apparatus comprising a camera sensor housed in a hardware module and a processor.

FIG. 3 illustrates an apparatus 2 comprising a camera sensor 10 and a processor 4 as previously described. In this example, processor 4 is a host processor 28.

The camera sensor 20 is housed in a hardware module 20 without a local processor and separate to the host processor 28.

The module 20 is part of a larger host apparatus 2. The host apparatus 2 comprises the module 20, a host processor 28, a memory 26 and user input and user output 6.

The host processor 28 is configured to read from and write to the memory 26. It is also configured to receive input commands from the user input 6 and provide output commands to the user output 6. The host processor 28 is also configured to communicate with the module 20.

The host processor 28 may be a multi-functional processor such as, for example, a central processing unit.

In this example, the functions of the processor 4 are performed by only the host processor 28.

Referring to FIGS. 1, 2 and 3, the area of interest 30 may be defined by a user or may be defined automatically.

User definition may be achieved by capturing and displaying the image 32 and enabling a user to select a portion of the image 32 using a user input 6.

The apparatus 2 may for example enable user-selection of an object 30 within the image 32. For example, the image 32 may be displayed on a touch sensitive display 6 and the user may select an object 30 by touching a portion of the touch-sensitive display corresponding to the object 30.

The apparatus 2 may for example enable user-selection of a portion 30 within the image 32. For example, the image 32 may be displayed on a touch sensitive display 6 and the user may select the image portion 30 by tracing a frame around the portion of image displayed on the touch-sensitive display 6.

The apparatus 2 may for example enable user-selection of a portion 30 within the image 32. For example, the portion 30 may for example correspond to a portion of the image used for auto-focusing.

In the embodiment described with reference to FIGS. 4A to 5D, when there is relative movement of the sensor frame of reference 44 and the image frame of reference 56, the processor 4 dynamically controls which sub-set 54 of pixels 52 of a captured image 50 are used to define a smaller target captured image 60.

FIG. 4A represents an image 32 of the real-world at a first time.

FIG. 4B illustrates that all of the sensor elements 42 of the N row by M column array 40 of contiguous sensor elements 42 are operational. The camera sensor 10 captures the image 32. The captured image 50 is illustrated in FIG. 4C.

FIG. 4C illustrates that the processor 4 can automatically select a sub-set 54 of the pixels 52 such that an area of interest 30 is included in the sub-set 54. In this example, the sub-set 54 is an array of $n_1$ rows and $m_1$ columns of pixels 52 positioned at $(x_1, y_1)$ and providing a field of view $X_1 \times Y_1$. The sub-set 54 has a pixel count of $n_1 * m_1$.

FIG. 4D illustrates that the sub-set 54 of the pixels defines the target captured image 60. If the target captured image 60 is displayed on the same display as the captured image 50 then it has an effective zoom of $M/m_1 (=N/n_1)$.

FIG. 5A represent an image 32 of the real-world at a second time shortly after the first time. The area of interest 30 has moved between the first time and the second time.

FIG. 5B illustrates that all of the sensor elements 42 of the N row by M column array 40 are operational. The camera sensor 10 captures the image 32. The captured image 50 is illustrated in FIG. 4C.

FIG. 5C illustrates that the processor 4 can automatically select a new sub-set 54 of the pixels 52 such that the area of interest 30 is included in the sub-set 54 despite having moved. The sub-set is an array of $n_2$ rows and $m_2$ columns of pixels 52 positioned at $(x_2,y_2)$ with a field of view $X_2 \times Y_2$. The sub-set 54 has a pixel count of $n_2*m_2$.

If the processor 4 performs transverse tracking only, then $n_1=n_2$, $m_1=m_2$, $X_1=X_2$, $Y_1=Y_2$, and $(x_1,y_1) \neq (x_2,y_2)$. The sub-set 54 remains the same size (same field of view), has the same resolution (same pixel count) but is repositioned.

If the processor 4 performs depth tracking only, then $X_1 \neq X_2$, $Y_1 \neq Y_2$, $X_1/Y_1=X_2/Y_2$ and $(x_1,y_1)=(x_2,y_2)$. The sub-set 54 remains at the same position but is re-sized (different field of view) while maintaining the same aspect ratio. The pixel count may remain the same $n_1=n_2$, $m_1=m_2$.

If the processor 4 performs transverse tracking and depth tracking, then $X_1 \neq X_2$, $Y_1 \neq Y_2$, $X_1/Y_1=X_2/Y_2$ and $(x_1,y_1) \neq (x_2,y_2)$ The sub-set 54 changes size (different field of view) and is repositioned. The pixel count may remain the same $n_1=n_2$, $m_1=m_2$.

FIG. 5D illustrates that the new sub-set 54 of the pixels defines the target captured image 60. If the target captured image 60 is displayed on the same display as the captured image 50 then it has an effective zoom of $M/m_2(=N/n_2)$.

In the illustrated example (transverse tracking only), the subset 54 of the pixels includes all of the available pixels within a sub-area of the captured image 50. That is there are no missing pixels. Changing the sub-set 54 involves selecting a new position of the sub-area within the captured image 50.

In the illustrated example, the new position of the sub-area within the captured image 50 is displaced from a previous position of the sub-area within the captured image 50 by the amount of relative movement of the sensor frame of reference 44 and the image frame of reference 56. The sub-area remains the same size.

The FIGS. 4A to 5D illustrate that the processor 4 is configured to track the area of interest 30 when it moves relative to the camera sensor 10 by dynamically changing which sub-set 102 of available pixels 100 are used to define the target captured image 60. The captured image comprises a N row by M column array of contiguous pixels and the processor 4 is configured to use only a n row by m column sub-array of contiguous pixels within the N×M array to define a n row by m column target captured image 60.

Tracking keeps the area of interest 30 within the target captured image 60 despite relative movement of the sensor frame of reference 44 and the image frame of reference 56. The area of interest 30 may in some embodiments be kept at a constant position within the target captured image 60, for example at the centre of the target captured image 60.

In the embodiment described with reference to FIGS. 6A to 7D, when there is relative movement of the sensor frame of reference 44 and the image frame of reference 56, the processor 4 dynamically controls which subset 44 of the multiple sensor elements 42 are used to capture the target captured image.

FIG. 6A represents an image 32 of the real-world at a first time.

FIG. 6B illustrates that only a subset 44 of the sensor elements 42 is operational. The camera sensor 10 comprises a N row by M column array 40 of contiguous sensor elements 42. The subset 44 is a n row by m column sub-set 44 of the array 40. The n row by m column sub-set 44 of the array 40 captures a portion of the image 32. The captured image 50 is illustrated in FIG. 6C.

FIG. 6C illustrates that the captured image 50 comprises a $n_1$ row by $m_1$ column array 54 of pixels 52 positioned at $(x_1,y_1)$ and providing a field of view $X_1 \times Y_1$. Each of the pixels 52 corresponds to a sensor element 42 in the sub-set 44 of the array 40 of sensor elements. The sub-set 54 has a pixel count of $n_1*m_1$. The $n_1$ row by $m_1$ column array 54 of pixels 52 is a sub-set of the N row by M column array of pixels that would have been captured had the whole of the whole of the camera sensor 10 been used. FIG. 6D illustrates that the sub-set 54 of the pixels defines the target captured image 60. The target captured image 60 has an effective zoom of M/m (=N/n).

FIG. 7A represents an image 32 of the real-world at a second time shortly after the first time. The area of interest 30 has moved between the first time and the second time.

FIG. 7B illustrates that only a subset 44 of the sensor elements 42 is operational. The subset 44 is a $n_2$ row by $m_2$ column sub-set 44 of the array 40 of N rows and M columns of sensor elements 42. The $n_2$ row by $m_2$ column sub-set 44 of the array 40 captures a portion of the image 32. The captured image 50 is illustrated in FIG. 7C.

$N*M-n_2*m_2$ of the sensor elements 42 do not capture the image.

The processor 4 can automatically select a new sub-set 44 of the sensor elements 42 such that the area of interest 30 is included in the sub-set 44 despite having moved. The sub-set is an array of $n_2$ rows and $m_2$ columns of pixels 52 positioned at $(x_2,y_2)$ with a field of view $X_2 \times Y_2$. The sub-set 44 has a pixel count of $n_2*m_2$.

If the processor 4 performs transverse tracking only, then $n_1=n_2$, $m_1=m_2$, $X_1=X_2$, $Y_1=Y_2$ and $(x_1,y_1) \neq (x_2,y_2)$. The sub-set 44 remains the same size (same field of view), has the same resolution (same pixel count) but is repositioned.

If the processor 4 performs depth tracking only, then $X_1 \neq X_2$, $Y_1 \neq Y_2$, $X_1/Y_1=X_2/Y_2$ and $(x_1,y_1)=(x_2,y_2)$. The sub-set 44 remains at the same position but is re-sized (different field of view) while maintaining the same aspect ratio. The pixel count may remain the same $n_1=n_2$, $m_1=m_2$.

If the processor 4 performs transverse tracking and depth tracking, then $X_1 \neq X_2$, $Y_1 \neq Y_2$, $X_1/Y_1=X_2/Y_2$ and $(x_1,y_1) \neq (x_2,y_2)$ The sub-set 44 changes size (different field of view) and is repositioned. The pixel count may remain the same $n_1=n_2$, $m_1=m_2$.

In the illustrated example (transverse tracking only), the subset 44 of the sensor elements 42 includes all of the available sensor elements 42 within a sub-area of the array 40 of sensor elements 42. That is there are no missing sensor elements. Changing the subset 44 involves selecting a new position of the sub-area within the array 40 of sensor elements 42.

In the illustrated example, the new position of the sub-area within the array 40 is displaced from a previous position of the sub-area within the array 40 by the amount of relative movement of the sensor frame of reference 44 and the image frame of reference 56. The sub-area remains the same size.

FIG. 7C illustrates that the captured image 50 comprises a $n_2$ row by $m_2$ column array 54 of pixels 52. Each of the pixels 52 corresponds to a sensor element 42 in the sub-set 44 of the array 40 of sensor elements 42. The $n_2$ row by $m_2$ column array 54 of pixels 52 is a sub-set of the N row by M column array of pixels that would have been captured had the whole of the whole of the camera sensor 10 been used.

The subset 54 of the pixels includes all of the available pixels within the captured image 50. That is there are no missing pixels.

FIG. 7D illustrates that the sub-set 54 of the pixels defines the target captured image 60. The target captured image 60 has an effective zoom of $M/m_2(=N/n_2)$.

The FIGS. 6A to 7D illustrate that the processor 4 is configured to track the area of interest 30 when it moves relative to the camera sensor 10 by dynamically changing which sub-set 102 of available pixels 100 are used to define the target captured image 60. In this embodiment, the processor 4 is configured to dynamically control which subset of the multiple sensor elements 42 are used to capture the image.

The processor 4 is configured to use only a n row by m column sub-array of contiguous sensor elements to define a n row by m column target captured image 60. The captured image comprises a n row by m column sub-set of a potential N row by M column array of contiguous pixels.

Tracking keeps the area of interest 30 within the target captured image 60 despite relative movement of the sensor frame of reference 44 and the image frame of reference 56. The area of interest 30 may in some embodiments be kept at a constant position within the target captured image 60, for example at the centre of the target captured image 60.

It will be appreciated from FIGS. 4A to 7D that when a defined area of interest 30 within the target captured image 60 approaches an edge of the target captured image 60 the sub-set of pixels 102 defining the target captured image 60 within a larger set of available pixels 100 is automatically moved by the processor 4 in a direction of an edge 101 of the target captured image 60. This enables tracking of the area of interest 60 as previously described.

The processor 4 may detect that an area of interest is approaching an edge of the target captured image in many different ways. As an example, the processor 4 may determine whether distances of the area of interest 30 from the edges 101 of the target captured image 60 satisfy a positional constraint for positioning the area of interest 30 within the sub-set of pixels 102. The positional constraint may, for example, require that the area of interest 60 overlaps a defined group of pixels at a central location in the sub-set of pixels 102 so that the area of interest 60 is centrally located within the target captured image 60 while it is tracked predominantly by movement of the sub-set of pixels 102 within the set of available pixels 100. Alternatively, the positional constraint may define a minimum distance of approach of the area of interest 60 towards an edge 101 so that the area of interest 60 is always located within the target captured image 60 while it is tracked but its location within the target captured image 60 may vary.

The processor 4 may be configured to additionally take account of image stabilization arising from camera shake when determining whether the area of interest is approaching the edge 101 of the target captured image 60. For example, the position of sub-set of pixels 102 defining the target captured image 60 within the larger set of available pixels 100 may be automatically adjusted to compensate for involuntary shaking of the apparatus 2 by a user holding the apparatus 2. An expected value for this adjustment may be used to vary the positional constrain so that the positional constraint is not violated because of image stabilization and the object of interest 30 remains within the target captured image 60.

Referring to FIGS. 8A to 8C, 9A to 9C and 10A to 10C, during a time period t1 to t2 an area of interest 30 moves towards an edge 103 of the set of available pixels 100. Between t2 and t3, a user redefines the set of available pixels 100. As illustrated in FIGS. 9A to 9C and 10A to 10C between time t2 and t3, when the set of available pixels 100 is redefined by the user, the location of the sub-set 100 of pixels jumps within the set of available pixels. However, as illustrated in FIGS. 8A to 8C, the sub-set of pixels 102 continues to track the area of interest 30.

FIGS. 8A to 8C illustrate different sub-sets of pixels 102 defining different target captured images 60 at times t1, t2 and t3. FIGS. 9A to 9C illustrate a post-capture embodiment in which the sets of available pixels are defined by captured images 50 that were captured at times t1, t2 and t3. The sub-sets of pixels 100 are selected post-capture from the captured images 50. FIGS. 10A to 10C illustrate an alternative pre-capture embodiment in which the sets of available pixels are defined by the array 40 of sensor elements 42. The sub-sets of pixels 100 are sub-sets 44 of sensor elements 42 used to capture the captured images 50 at times t1, t2 and t3.

In this example, the area of interest 30 is a moving object, for example a car. The object 30 is moving to the left relative to the stationary background scene 104. The object 30 is continually approaching a left edge 101 of the target captured image 60 and the processor 4 automatically moves the sub-set of pixels 102 defining the target captured image 60 within the larger set of available pixels 100 in a direction of the edge 101. The object 30 is thus tracked and remains within the target captured image 60 as illustrated in FIG. 8A.

However, as this tracking process continues, the sub-set of pixels 102 approaches an edge 103 of the set of available pixels 100. This is illustrated in FIGS. 8B, 9B, 9C.

The processor 4 is configured to detect when the sub-set of pixels 102 approaches an edge (e.g. edge 103) of the set of available pixels 104. The processor 4 is configured to provide, in response to that detection, a pre-emptive user output 110 that facilitates or instigates user action that redefines the set of available pixels 100.

Redefinition of the set of available pixels 100 may, for example, occur if a larger portion of a scene 104 is captured or a different but partially overlapping portion of the scene 104 is captured.

In the illustrated example, an object 30 travels in front of a range of stylized mountains numbered 1 to 13. At times t1 and t2, the set of available pixels corresponds to the same scene (mountains 1 to 8). At time t2, the user has discretely redefined the set of available pixels. By pointing the apparatus towards the left, the set of available pixels 100 corresponds to a different scene (mountains 7 to 13). The sub-set of pixels 102 however tracks the object of interest 30 from time t1 to t3 and gradually moves across the scene 104. A discrete change of a position of the object of interest 30 within the sub-set of pixels 102 is avoided by automatically tracking the object 30 by moving a location of the sub-set of pixels 102 within the set of available pixels 100 from the left to the right at time t2.

In FIG. 8B, the user output 110 comprises instructions to tilt the apparatus in the direction of the left edge 103 of the set of available pixels 100. The tilt in this example is to the left, that is it is a rotation counter-clockwise about a virtual axis extending vertically through the apparatus 2 (yaw).

In other examples, the tilt may be to the right (a rotation clockwise about the virtual axis extending vertically through the apparatus 2), up (a rotation counter-clockwise about a virtual axis extending from right to left horizontally through the apparatus 2) or down (a rotation clockwise about a virtual axis extending from right to left horizontally through the apparatus 2) or some combination of left and up or down or some combination of right and up or down.

In the illustrated example of FIG. 8B, the user output 110 is a visual user output that is displayed simultaneously with the target captured image 60 in a viewfinder display. It comprises two horizontal vertically separated arrows at the left edge 101 of the target captured image pointing to the left. The pair of arrows indicate that the user should re-direct the apparatus so that it points more to the left.

As is illustrated in FIGS. 8C, 9C and 10C, when the user reorients the apparatus by pointing it more to the left, the set of available pixels 100 changes but the sub-set of pixels 102 still tracks the object 30. There is therefore a sudden discrete transition in the set of available pixels 100 caused by the user action. There is also a sudden discrete transition in a location of the sub-set of pixels 102 in the set of available pixels 100 caused by the user action. However, there is no sudden discrete transition in the location of the object 30 within the sub-set of pixels 102. That is the sub-set of pixels 102 tracks the object 30 even when the set of available pixels 100 suddenly changes.

The processor 4 may be configured to detect the sub-set of pixels 102 approaching an edge of the set of available pixels 100 in a number of different ways. For example, the processor 4 may determine when it is likely that the sub-set of pixels 102 will reach the edge of the set of available pixels 100 within an expected user response time. An expected user response time is an estimate of the time one would expect to elapse between user output 110 and the user taking action.

As an example, the processor 4 may determine a distance of the sub-set of pixels 102 from the edges of the set of available pixels 100 and the velocities of the sub-set of pixels 102 towards the edges of the set of available pixels 100. The processor 4 may then determine that the sub-set of pixels 102 is approaching an edge of the set of available pixels 100 when a distance of the sub-set of pixels 102 from that edge of the set of available pixels 100 is less than or equal to an expected distance travelled by sub-set of pixels 102 in the user response time (or less than or equal to that distance multiplied by a factor greater than 1).

Figure 13:
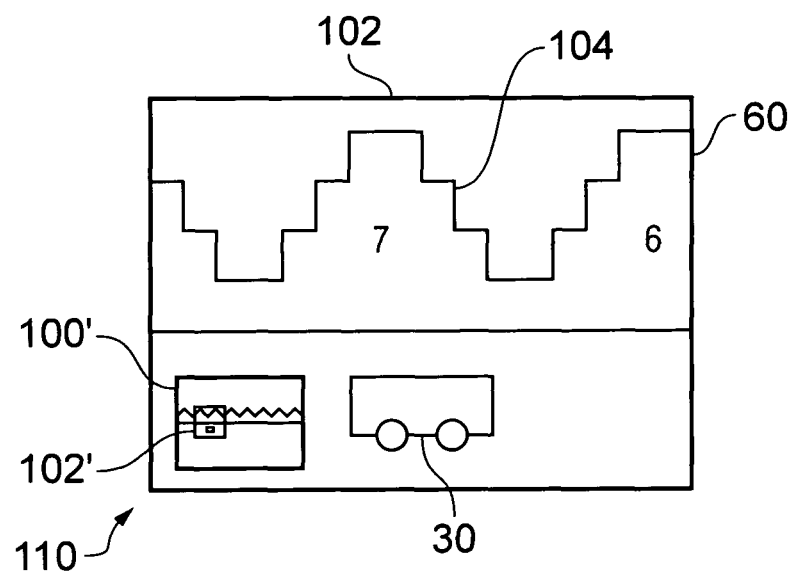
FIG. 13 illustrates an example of an alternative pre-emptive user output comprising a picture within a picture.

In FIG. 8B, a particular type of user output 110 is provided pre-emptively to avoid loss of tracking when the sub-set of pixels 102 approaches an edge of the set of available pixels 100. However, other forms of pre-emptive user output 110 may be provided. FIG. 13 illustrates an example. In this example, the pre-emptive user out 110 comprises a first picture 102' within a second picture 100' displayed on a viewfinder display that is also displaying the target captured image 60. The first picture 102' overlies the simultaneously displayed second picture 100' which overlies the simultaneously displayed target captured image 60. The first picture 102' corresponds to the sub-set of pixels 102. The second picture 100' corresponds to the set of available pixels. The location of the first picture 102' within the second picture 100' illustrates a location of edges of the sub-set of pixels 102 within the set of available pixels 100.

Referring to FIG. 11A a first object of interest $30_1$, which is moving left, is positioned towards a left edge of the target captured image 60 and a second object of interest $30_2$, which is moving right, is positioned towards a right edge of the target captured image 60. The two objects of interest $30_1$ $30_2$ diverge in space and it will not be possible to simultaneously display the two objects of interest in the same target captured image 60, if the same field of view (zoom) is maintained for the target captured image 60.

The processor 4 is configured to move automatically the sub-set of pixels 102 defining the target captured image 60 within the larger set of available pixels 100 to track the objects of interest. However, if two objects of interest 30 are approaching opposite edges of the target captured image 60. The processor 4 may be configured to resolve this conflict by moving automatically the sub-set of pixels 102 defining the target captured image 60 within the larger set of available pixels 100 in a direction of the edge approached by whichever of the two objects of interest 30 has priority.

The priority may be set by a user. As illustrated in FIG. 11B, the processor 4 has detected that there is a conflict between the first object of interest $30_1$ and the second object of interest $30_2$. It resolves the conflict by providing a user output 107 that asks the user to prioritize one of the objects $30_1$ $30_2$ over the other. Only the object that is prioritized is tracked (FIG. 12C).

Alternatively, the priority may be have been pre-set by a user. For example, the order in which the user selected the objects of interest $30_1 30_2$ for tracking may be recorded as a priority order. In this example, when the processor 4 has detected that there is a conflict between the first object of interest $30_1$ and the second object of interest $30_2$, it automatically resolves the conflict by automatically tracking only the priority object (FIG. 12C).

In an alternative embodiment, as illustrated in FIGS. 12A and 12B, when the processor 4 has detected that there is a conflict between the first object of interest $30_1$ and the second object of interest $30_2$., it resolves the conflict by automatically increasing the field of view of the target captured image 60. That is it increases the size of the sub-set of pixels 102.

The processor 4 may be configured to record sub-set edge detection events for each edge of the set of available pixels 100. A sub-set edge detection event occurs when the sub-set of pixels 102 approaches that edge of the set of available pixels 100, that is, it is the event that triggers the pre-emptive user output 110 that facilitates redefinition of the set of available pixels 100 by the user.

If the frequency of the sub-set edge detection events is above a threshold value, the processor 4 may increase a size of the set of available pixels 100 relative to a size of the sub-set of pixels 102. The processor 4 may for example automatically increase a size of the set of available pixels 100 using automatic optical zoom and/or automatically decrease a size of the sub-set of pixels 102.

Figure 14:
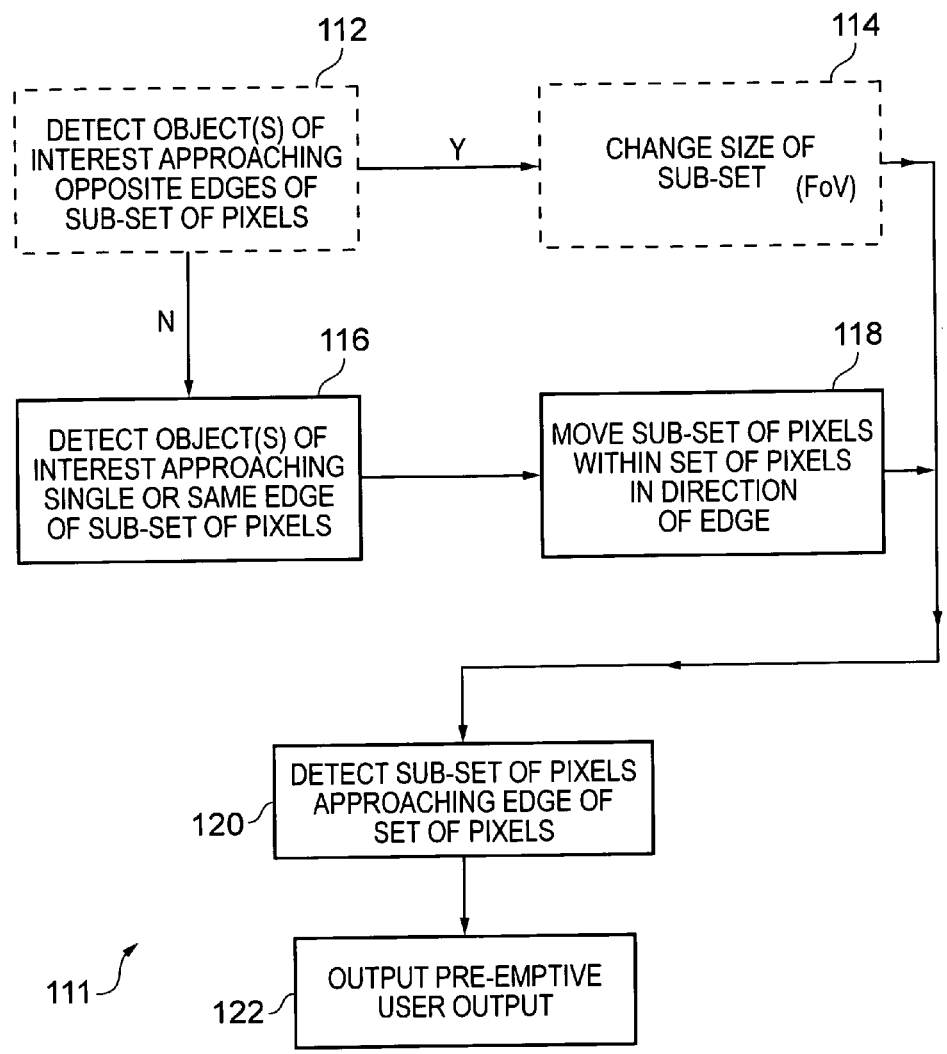
FIG. 14 illustrates an example of a method.

FIG. 14 illustrates a method 111 in which a area/object of interest 30 is tracked by moving a sub-set of pixels 100 and loss of tracking is prevented, when the sub-set of pixels 102 approaches an edge of the set of available pixels 100, by facilitating user re-definition of the set of available pixels 100. This re-definition relocates the sub-set of pixels 102 within the set of available pixels 100 further away from the edge.

At block 116, the processor 4 detects in a sub-set of pixels 102 defining a target captured image 60, an area of interest 30 approaching an edge of the target captured image 60.

Next at block 118, the processor 4 moves the sub-set of pixels 102 within a larger set of available pixels 100 in a direction of that edge.

Then at block 120, the processor 4 detects that the sub-set of pixels 102 is approaching an edge of the set of available pixels 100.

Next, at block 122 the processor 4 provides a pre-emptive user output 110. This user output 110 facilitates user action that redefines the set of available pixels 100 pre-emptively, that is, before tracking of the object 30 is lost.

The method 111 may optionally be augmented as illustrated in FIG. 14.In the illustrated example, at optional block 112 if the processor 4 detects in a sub-set of pixels 102 defining a target captured image 60, a single area of interest 30 approaching opposite edges of the target captured image 60 or different areas of interest 30 approaching opposite edges of the target captured image 60 then the method moves to block 114. Otherwise the method moves to block 116 and continues as described above.

At block 114, the processor 4 increases a size of the sub-set of pixels 102. This increases the field of view, that is, it provides a digital zoom-out. The method then proceeds to block 120.

The method 116 may be used to automatically track an area of interest 30 such that it remains within a target captured image 60 and/or remains at the same scale. This is achieved by controlling which subset 102 of available pixels 100 is used to define the target captured image. The selection of the sub-set 102 may occur pre-capture by selecting a sub-set 44 of sensor elements used to capture the image or post-capture by selecting a sub-set 54 of the already captured pixels 52. The selection of the sub-set 102 may occur as part of a transverse tracking process. The selection of the sub-set 102 may occur as part of a depth tracking process.

Implementation of the processor 4 can be in hardware alone (a circuit, a microprocessor etc, have certain aspects in software including firmware alone or can be a combination of hardware and software (including firmware).

The processor 4 may be implemented using instructions that enable hardware functionality, for example, by using executable computer program instructions in a general-purpose or special-purpose processing unit that may be stored on a computer readable storage medium (disk, memory etc) to be executed by such a processing unit.

Figure 15A:
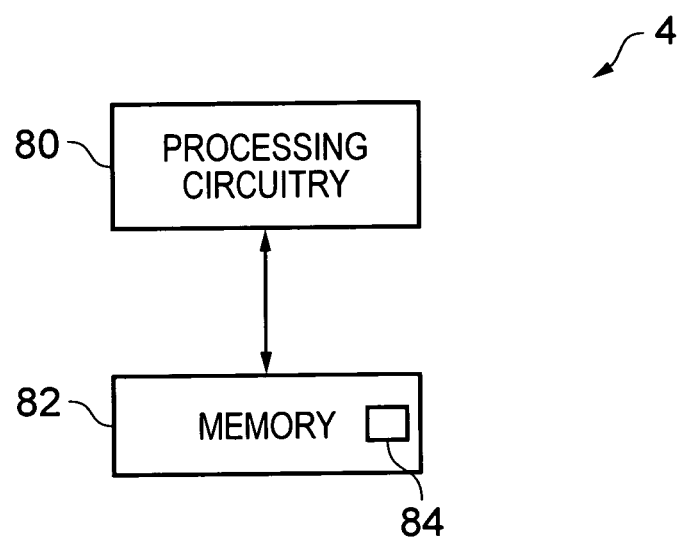
FIG. 15A illustrates an example of a processor.

Referring to FIG. 15A, the processor 4 may comprise processing circuitry 80 that is configured to read from and write to a memory 82. The processing circuitry 80 may also comprise an output interface via which data and/or commands are output by the processor 4 and an input interface via which data and/or commands are input to the processor 4.

The memory 82 may store a computer program 84 comprising computer program instructions that control the operation of the processor 4 when loaded into the processing circuitry 80. The computer program instructions provide the logic and routines that enables the processor 4 to perform the methods illustrated in FIG. 4A-4D, 5A-5D, 6A-6D, 7A-7D, 8A-8C, 9A-9C, 10A-10C, 11A-11B, 12A-12C, 13 and 14. The processing circuitry 80 by reading the memory 82 is able to load and execute the computer program 84.

The apparatus 2 may therefore comprises: at least one processor; and at least one memory including computer program code the at least one memory and the computer program code configured to, with the at least one processor, cause the apparatus at least to perform: in response to detecting in a sub-set of pixels 102 defining a target captured image 60, an area of interest 30 approaching an edge of the target captured image 60, moving the sub-set of pixels 102 within a larger set of available pixels 100 in a direction of the edge; and in response to detecting the sub-set of pixels 102 approaching an edge of the set of available pixels 100, providing a pre-emptive user output 110.

Figure 15B:
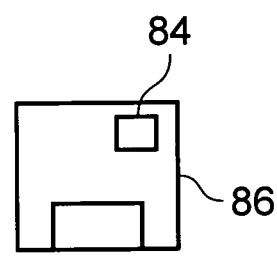
FIG. 15B illustrates an example of a carrier embodying a computer program.

Referring to FIG. 15B, the computer program 84 may arrive at the processor 4 via any suitable delivery mechanism 86. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program. The delivery mechanism may be a signal configured to reliably transfer the computer program. The apparatus may propagate or transmit the computer program as a computer data signal.

Although the memory 82 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

As used here 'module' refers to a unit or apparatus that excludes certain parts/components that would be added by an end manufacturer or a user.

The blocks illustrated in the FIG. 14 may represent steps in a method and/or sections of code in the computer program 84. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
a viewfinder display configured to display a first and second picture, a processor configured to move automatically a sub-set of pixels defining a target captured image that corresponds to the first picture, within a larger set of available pixels in a direction of an edge of the target captured image when a defined area of interest within the target captured image approaches the edge of the target captured image, said processor configured to provide a pre-emptive user output when the sub-set of pixels approaches an edge of the set of available pixels, and the second picture corresponds to the larger set of available pixels, wherein the viewfinder display is configured to display the first picture within the second picture.

2. An apparatus as claimed in claim 1, wherein the user output comprises instructions to tilt the apparatus.

3. An apparatus as claimed in claim 2, further comprising a viewfinder display, wherein the instructions are displayed on the viewfinder display while displaying at least the sub-set of pixels.

4. An apparatus as claimed in claim 1, wherein the user output comprises instructions whether to prioritize one area of interest over another area of interest.

5. An apparatus as claimed in claim 1, wherein the first picture illustrates a location of edges of the sub-set of pixels within the set of available pixels.

6. An apparatus as claimed in claim 1, wherein the processor is configured to detect an area of interest approaching an edge of the target captured image by determining whether a distance of the area of interest from the edge of the target captured image satisfies a positional constraint for positioning the area of interest within the sub-set of pixels.

7. An apparatus as claimed in claim 6, wherein the positional constraint requires that the area of interest overlaps a defined group of pixels at a central location in the sub-set of pixels.

8. An apparatus as claimed in claim 7, wherein the positional constraint defines a minimum distance of approach of the area of interest towards the edge.

9. An apparatus as claimed in claim 6, wherein the processor is configured to additionally take account of image stabilization arising from camera shake when determining whether the area of interest is approaching the edge of the target captured image.

10. An apparatus as claimed in claim 1, wherein the processor is configured to detect the sub-set of pixels approaching an edge of the set of available pixels by determining a distance of the sub-set of pixels from the edge and a velocity of the sub-set of pixels towards the edge of the set of available pixels.

11. An apparatus as claimed in claim 1, wherein the processor is configured to detect the sub-set of pixels approaching an edge of the set of available pixels by determining that it is likely that the sub-set of pixels will reach the edge of the set of available pixels within an expected user response time.

12. An apparatus as claimed in claim 1, wherein the processor is configured to record sub-set edge detection events for each edge of the set of available pixels where a sub-set edge detection event for an edge occurs when the sub-set of pixels approaches that edge of the set of available pixels and is configured to increase a size of the set of available pixels relative to a size of the sub-set of pixels in response to the recorded edge detection events.

13. An apparatus as claimed in claim 12, wherein the processor is configured to increase automatically a size of the available pixels using automatic optical zoom and/or automatically decrease a size of the sub-set of pixels.

14. An apparatus as claimed in claim 1, wherein the processor is configured to automatically increase a size of the sub-set of pixels within the set of available pixels when a first area of interest and a second area of interest simultaneously approach opposite edges of the target captured image.

15. An apparatus as claimed in claim 1, wherein when a first area of interest approaches a first edge of the target captured image and a second area of interest approaches a second edge of the target captured image that is opposite the first edge, the processor is configured to move the sub-set of pixels within the set of available pixels in a direction of a first edge when the first area of interest has priority and to move the sub-set of pixels within the set of available pixels in a direction of the second edge when the second area of interest has priority.

16. An apparatus as claimed in claim 15, wherein the priority is user determined in response to the user output which comprises instructions to prioritize one area of interest over another area of interest.

17. An apparatus as claimed in claim 15, wherein the priority is configured to be predetermined by the user.

18. A method comprising:
detecting in a sub-set of pixels within a larger set of available pixels that define a target captured image, detecting an area of interest within the sub set of pixels approaching an edge of the target captured image and in response to said detection moving the sub-set of pixels within the larger set of available pixels in a direction of the edge; and
in response to detecting the sub-set of pixels approaching an edge of the set of available pixels, providing a pre-emptive user output,
displaying on a viewfinder a first picture corresponding to the sub set of pixels and a second picture corresponding to the available set of pixels.

19. A method as claimed in claim 18, wherein the user output facilitates use action that redefines the set of available pixels.

20. A method as claimed in claim 19, wherein the user output comprises instructions to tilt the apparatus or comprises instructions whether to prioritize one area of interest over another area of interest comprising the first picture within the second picture displayed on the viewfinder display, wherein the first picture illustrates a location of edges of the sub-set of pixels within the set of available pixels.

21. An apparatus comprising:
at least one processor; and
at least one memory including computer program code
the at least one memory and the computer program code configured to, with the at least one processor, cause the apparatus at least to perform:
detecting in a sub-set of pixels within a larger set of available pixels that define a target captured image, detect an area of interest within the subset of pixels approaching an edge of the target captured image and in response to said detection moving the sub-set of pixels within the larger set of available pixels in a direction of the edge; and
in response to detecting the sub-set of pixels approaching an edge of the set of available pixels, providing a pre-emptive user output,
displaying on a viewfinder a first picture corresponding to the sub set of pixels and a second picture corresponding to the available set of pixels.

* * * * *